No. 617,768. Patented Jan. 17, 1899.
L. PRIDEAUX.
THILL COUPLING.
(Application filed Feb. 7, 1898.)
(No Model.) 2 Sheets—Sheet 1.
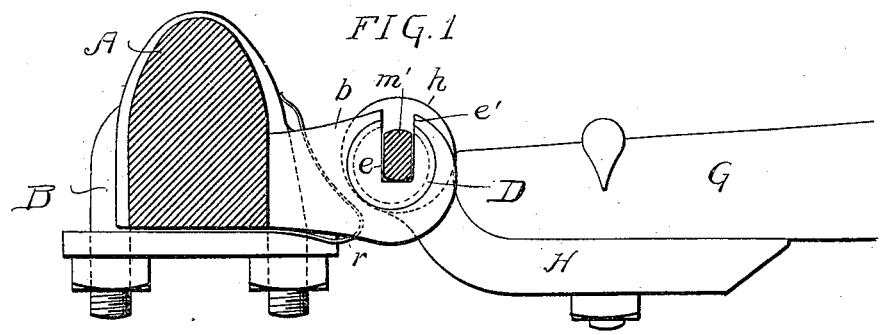
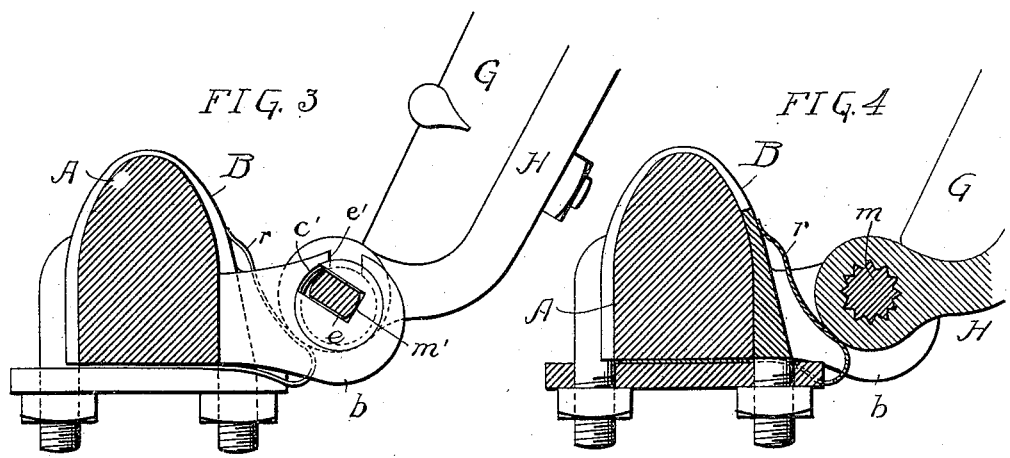
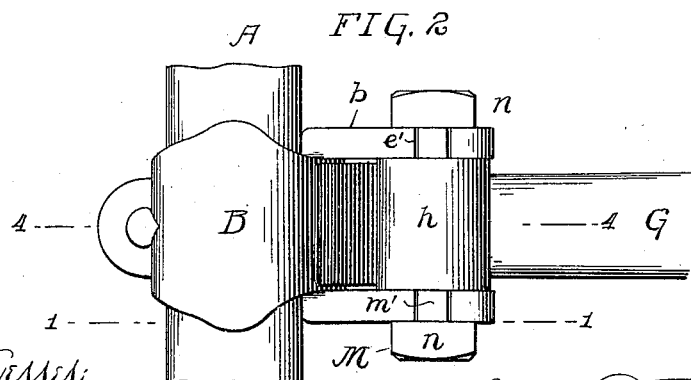
THE NORRIS PETERS CO., PHOTO-LITHO., WASHINGTON, D. C.

No. 617,768. Patented Jan. 17, 1899.
L. PRIDEAUX.
THILL COUPLING.
(Application filed Feb. 7, 1898.)
(No Model.) 2 Sheets—Sheet 2.
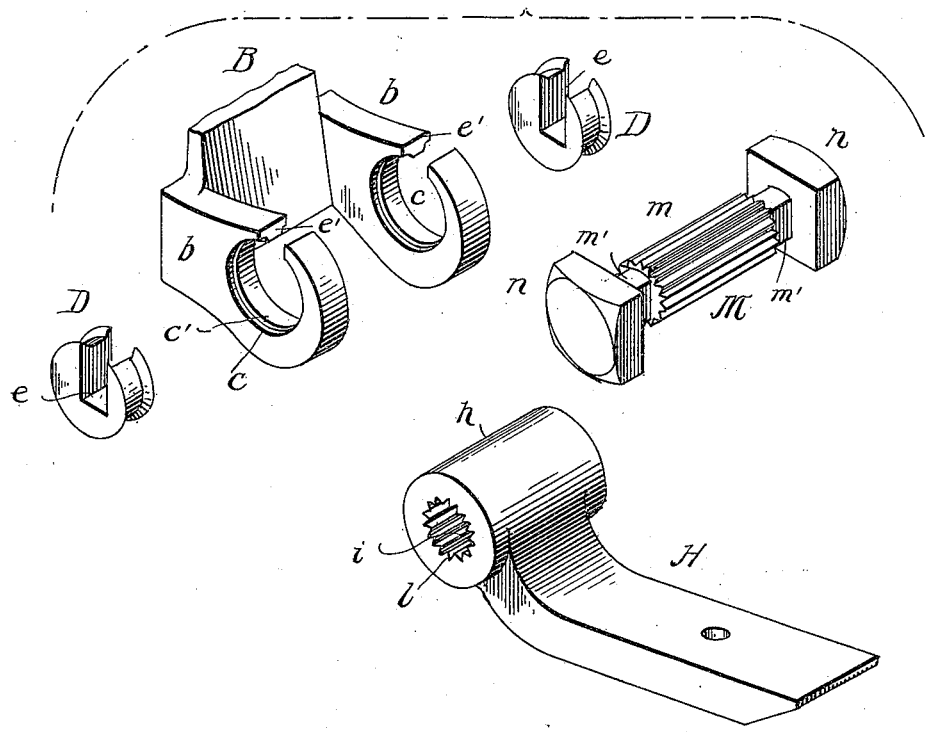
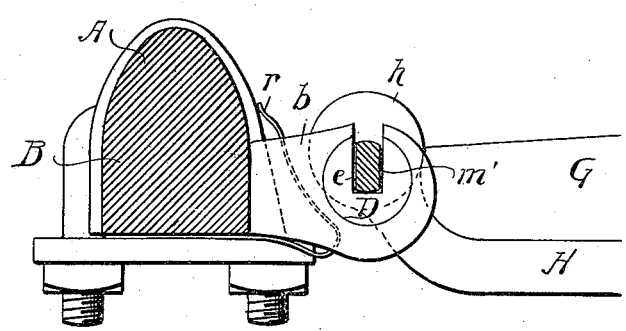

UNITED STATES PATENT OFFICE.

LEWIS PRIDEAUX, OF PHILADELPHIA, PENNSYLVANIA.

THILL-COUPLING.

SPECIFICATION forming part of Letters Patent No. 617,768, dated January 17, 1899.

Application filed February 7, 1898. Serial No. 669,355. (No model.)

*To all whom it may concern:*

Be it known that I, LEWIS PRIDEAUX, a citizen of the United States, and a resident of the city of Philadelphia, State of Pennsylvania, have invented certain new and useful Improvements in Thill-Couplings, of which the following is a full, clear, and exact description, reference being had to the accompanying drawings, forming part of this specification.

My invention relates to certain improvements in thill-couplings, and has for its object to provide an improved form of thill-coupling which may be readily attached to a carriage or other vehicle and of such construction as to permit of the ready coupling and uncoupling of the shafts, as more fully set forth hereinafter.

In the accompanying drawings, Figure 1 is a sectional elevation on the line 1 1, Fig. 2, of a thill-coupling constructed in accordance with my invention. Fig. 2 is a plan view of the same. Fig. 3 is a view similar to Fig. 1, illustrating the position of the parts when the shafts are elevated and harnessed to the horse. Fig. 4 is a sectional elevation of the coupling on the line 4 4, Fig. 2. Fig. 5 is a perspective view illustrating the principal part of the coupling detached, and Fig. 6 is a sectional elevation of the modified form of the coupler.

Referring to the drawings, A represents the shaft to which is secured a clip B, having forwardly-projecting ears or lugs $b$, provided near their outer ends with circular openings $c$ for the reception of circular blocks D. The periphery of each block is grooved, and the wall of each opening $c$ is provided with an annular rib $c'$, adapted to the grooves and serving to retain the block in position without, however, interfering with the turning of the same. Each block has a vertical slot $e$, which during the coupling and uncoupling of the parts is in line with a slot or opening $e'$ in the ears $b$, and such slot $e$ is arranged, preferably, to one side of the center of the blocks D, for the purpose more fully described hereinafter, although it may be on the central line of such block, if desired.

To the end of the shaft G is secured a thill-iron H, having an enlarged cylindrical end portion $h$, through which is formed an opening $i$, having its walls provided with one or more corrugations or ribs $l$, and through this opening is passed a bolt M, having a central portion $m$ of a contour similar to that of the opening $i$, and having near each end flattened sections $m'$, adapted to seat within the slots $e$ of the blocks D, suitable bolt-heads or collars $n$ being provided at each end of the bolt to prevent longitudinal displacement.

Between the lower clip-section and the under side of the shaft is secured a plate-spring $r$, having its outer free end bent at about a right angle and extending upwardly between the ears $b$ and adapted to be engaged by the cylindrical portion $h$ of the thill-iron H when the shafts are elevated and harnessed to the horse.

To secure the parts of the coupling to each other, the shaft is held in the position shown in Fig. 1 and the flattened portions $m'$ of the bolt M are passed through the slot $e'$ and into the slot $e$. When the shafts are raised to the harnessing position, as shown in Fig. 3, the block D is turned in the circular guideway formed by the rib $c'$ and as the slots $e$ $e'$ are moved out of alinement the ends of the bolt will be firmly and securely locked in position. As the shaft extends through the eccentrically-disposed slot $e$, it follows that the raising of such block by elevating the shaft will induce an eccentric movement of the central portion $l$ of the thill-iron H, causing the surface of the portion $h$ to move into frictional contact with the spring $r$, which serves to firmly hold the parts in position and prevent the rattling due to loose fittings, as in the ordinary thill-coupling.

The central portion $m$ of the bolt M may be provided with only one of the serrations or slots, or it may be keyed or otherwise secured to the central portion $h$ of the thill-iron, as desired. The construction here shown permits of the removal of the bolt M and the substitution of the ordinary hinge-bolt commonly employed in thill-couplings, such bolt being of a diameter less than the maximum diameter of the opening $l$, so that the bolt may be passed through without interfering with the locking-ribs.

As a modification of the structure the slot $e$ may be placed centrally in the blocks and the bolt M disposed eccentrically to the portion $h$ of the thill-iron, as shown in Fig. 6, the parts then being so arranged that contact with the spring $r$ is prevented until after the shaft is elevated, the portion $h$ then being forced against the spring, so that the parts of the coupling will be held in contact and rattling prevented.

In lieu of forming the bolt M as a separate member the portions $m'$ may be in the form of lugs formed integral with the portion $h$ and projecting laterally from opposite sides thereof.

Having thus described my invention, what I claim, and desire to secure by Letters Patent, is—

1. The combination in a thill-coupling, of the axle-clip having projecting ears or lugs, $b$, provided with slots, $e'$, and circular guideways, $c'$, blocks, D, adapted to said guideways and provided with eccentrically-disposed slots, $e$, a thill-iron, H, a bolt, M, carried thereby and having flattened end portions adapted to said slots and a spring, $r$, with which the thill-iron comes in contact when the two parts of the coupling are in the locked position, substantially as specified.

2. The combination in a thill-coupling, of the axle-clip having projecting ears or lugs, $b$, provided with slots, $e'$, and circular guideways, $c'$, blocks, D, adapted to said guideways and provided with slots, $e$, a thill-iron, H, a bolt, M, carried thereby and having flattened end portions adapted to said slots, collars, $n$, provided upon each end of said bolt adapted to the outer faces of the lugs, $b$, and spring, $r$, with which the thill-iron comes in contact when the parts of the coupling are in the locked position, substantially as described.

3. The combination in a thill-coupling, of the axle-clip having projecting ears or lugs, $b$, provided with slots, $e'$, circular guideways, $c'$, blocks, D, adapted to said guideways and provided with the slots, $e$, a thill-iron, H, a longitudinally-serrated bolt, M, carried thereby and having flattened end portions adapted to said slots, collars, $n$, provided upon the ends of said bolts, substantially as described.

4. In a thill-coupling having slotted circular blocks adapted to guideways in the lugs of the clip, a thill-iron, H, having a cylindrical end portion, $h$, spring, $r$, a bolt, M, having flattened end portions adapted to said slotted circular blocks eccentrically provided through said cylindrical portion, $h$, adapted when the shafts are raised to form contact with the spring, $r$, and to be out of contact with the same when lowered, substantially as described.

In witness whereof I have hereunto set my hand this 2d day of February, A. D. 1898.

LEWIS PRIDEAUX.

Witnesses:
 FRANK D. GRAHAM,
 HORACE PETTIT.